US012755534B2

(12) United States Patent
Kodama

(10) Patent No.: US 12,755,534 B2
(45) Date of Patent: Oct. 6, 2026

(54) ON-VEHICLE RECORDING CONTROL APPARATUS AND RECORDING CONTROL METHOD

(71) Applicant: JVCKENWOOD Corporation, Yokohama (JP)

(72) Inventor: Kentaro Kodama, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 271 days.

(21) Appl. No.: 18/627,468

(22) Filed: Apr. 5, 2024

(65) Prior Publication Data

US 2024/0265701 A1 Aug. 8, 2024

Related U.S. Application Data

(63) Continuation of application No. PCT/JP2022/034285, filed on Sep. 13, 2022.

(30) Foreign Application Priority Data

Oct. 29, 2021 (JP) ................................ 2021-177795
Jul. 19, 2022 (JP) ................................ 2022-114808

(51) Int. Cl.
*G06V 20/40* (2022.01)
*G10L 15/22* (2006.01)

(52) U.S. Cl.
CPC .............. *G06V 20/44* (2022.01); *G10L 15/22* (2013.01); *G10L 2015/223* (2013.01)

(58) Field of Classification Search
None
See application file for complete search history.

(56) References Cited

U.S. PATENT DOCUMENTS

2002/0035475 A1* 3/2002 Yoda ....................... G10L 15/24 704/E15.041
2013/0201272 A1* 8/2013 Enbom ................. H04M 3/567 348/E7.078

(Continued)

FOREIGN PATENT DOCUMENTS

CN 105551109 A * 5/2016 ............ G10L 15/22
JP 2008003371 A * 1/2008

(Continued)

OTHER PUBLICATIONS

International Search Report and Written Opinion for International Application Serial No. PCT/JP2022/034285 mailed on Dec. 6, 2022, 10 pages.

*Primary Examiner* — Amandeep Saini
*Assistant Examiner* — Caroline Tabancay Duffy
(74) *Attorney, Agent, or Firm* — Amin, Turocy & Watson, LLP

(57) ABSTRACT

An on-vehicle recording control apparatus includes: a captured data acquisition unit configured to acquire video data captured by a camera that captures an image of surroundings of a vehicle; an operation controller configured to receive voice operation based on a voice command instructing event recording; a detection unit configured to detect a speech state of the voice command of the voice operation received by the operation controller; and a recording controller configured to: record the video data acquired by the captured data acquisition unit; generate event data while changing, based on the speech state of the voice command detected by the detection unit when the operation controller receives the voice operation for event recording, a period of the event data that is extracted from the video data; and store the generated event data.

4 Claims, 7 Drawing Sheets

(56) References Cited

U.S. PATENT DOCUMENTS

| | | | | |
|---|---|---|---|---|
| 2016/0292936 | A1* | 10/2016 | Palmer | B60R 16/023 |
| 2017/0200449 | A1* | 7/2017 | Penilla | G10L 25/63 |
| 2021/0370879 | A1* | 12/2021 | Julian | G06V 40/166 |
| 2022/0217298 | A1 | 7/2022 | Kasuya | |

FOREIGN PATENT DOCUMENTS

| | | | | |
|---|---|---|---|---|
| JP | 2021-051628 | | 4/2021 | |
| KR | 20150065643 | A * | 6/2015 | H04Q 9/00 |

* cited by examiner

ON-VEHICLE RECORDING CONTROL APPARATUS AND RECORDING CONTROL METHOD

CROSS-REFERENCE TO RELATED APPLICATIONS

This application is a Continuation of PCT International Application No. PCT/JP2022/034285 filed on Sep. 13, 2022 which claims the benefit of priority from Japanese Patent Application No. 2021-177795 filed on Oct. 29, 2021 and Japanese Patent Application No. 2022-114808 filed on Jul. 19, 2022, the entire contents of all of which are incorporated herein by reference.

FIELD OF THE INVENTION

The present application relates to an on-vehicle recording control apparatus and a recording control method.

BACKGROUND OF THE INVENTION

A drive recorder records an event when a collision is detected based on acceleration and when user operation is performed. In the case of the user operation, a speech of a voice command is included. A technology related to a drive recorder that records an event upon receiving a voice command has been proposed (for example, Japanese Laid-open Patent Publication No. 2021-051628).

In the drive recorder using a voice command, an event is recorded by detection of the event based on acceleration and by detection of a speech of "ro-ku-ga-ka-i-shi", for example. There may be a case in which an event is to be recorded urgently even when an own vehicle is not a subject of an accident, such as when the event is not detected by an acceleration sensor. In this case, there may be a case in which a voice command is spoken in a calm state and a case in which a voice command is not spoken in a calm state. For example, the case in which a voice command is spoken in a calm state may be a non-urgent case or a case in which an event to be recorded is predicted and a voice command is spoken at an appropriate timing. In contrast, the case in which a voice command is not spoken in a calm state may be a case in which an event to be recorded suddenly occurs or a case in which an event is not immediately recognized. In the latter case, there may be a case in which the event or the like is not appropriately recorded in recorded event data.

SUMMARY OF THE INVENTION

An on-vehicle recording control apparatus and a recording control method are disclosed.

According to one aspect of the present application, there is provided an on-vehicle recording control apparatus comprising: a captured data acquisition unit configured to acquire video data captured by a camera that captures an image of surroundings of a vehicle; an operation controller configured to receive voice operation based on a voice command instructing event recording; a detection unit configured to detect a speech state of the voice command of the voice operation received by the operation controller; and a recording controller configured to: record the video data acquired by the captured data acquisition unit; generate event data while changing, based on the speech state of the voice command detected by the detection unit when the operation controller receives the voice operation for event recording, a period of the event data that is extracted from the video data; and store the generated event data.

According to one aspect of the present application, there is provided a recording control method implemented by an on-vehicle recording control apparatus comprising: a step of acquiring video data captured by a camera that captures an image of surroundings of a vehicle; a step of receiving voice operation based on a voice command instructing event recording; a step of detecting a speech state of the voice command of the received voice operation; and a step of recording the video data, generating event data while changing, based on the speech state of the voice command when the voice operation for event recording is received, a period of the event data that is extracted from the video data, and storing the generated event data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE INVENTION

Embodiments of an on-vehicle recording control apparatus and a recording control method according to the present application will be described in detail below with reference to the accompanying drawings. The present invention is not limited by the embodiments below.

First Embodiment

On-Vehicle Recording Apparatus

Figure 1:
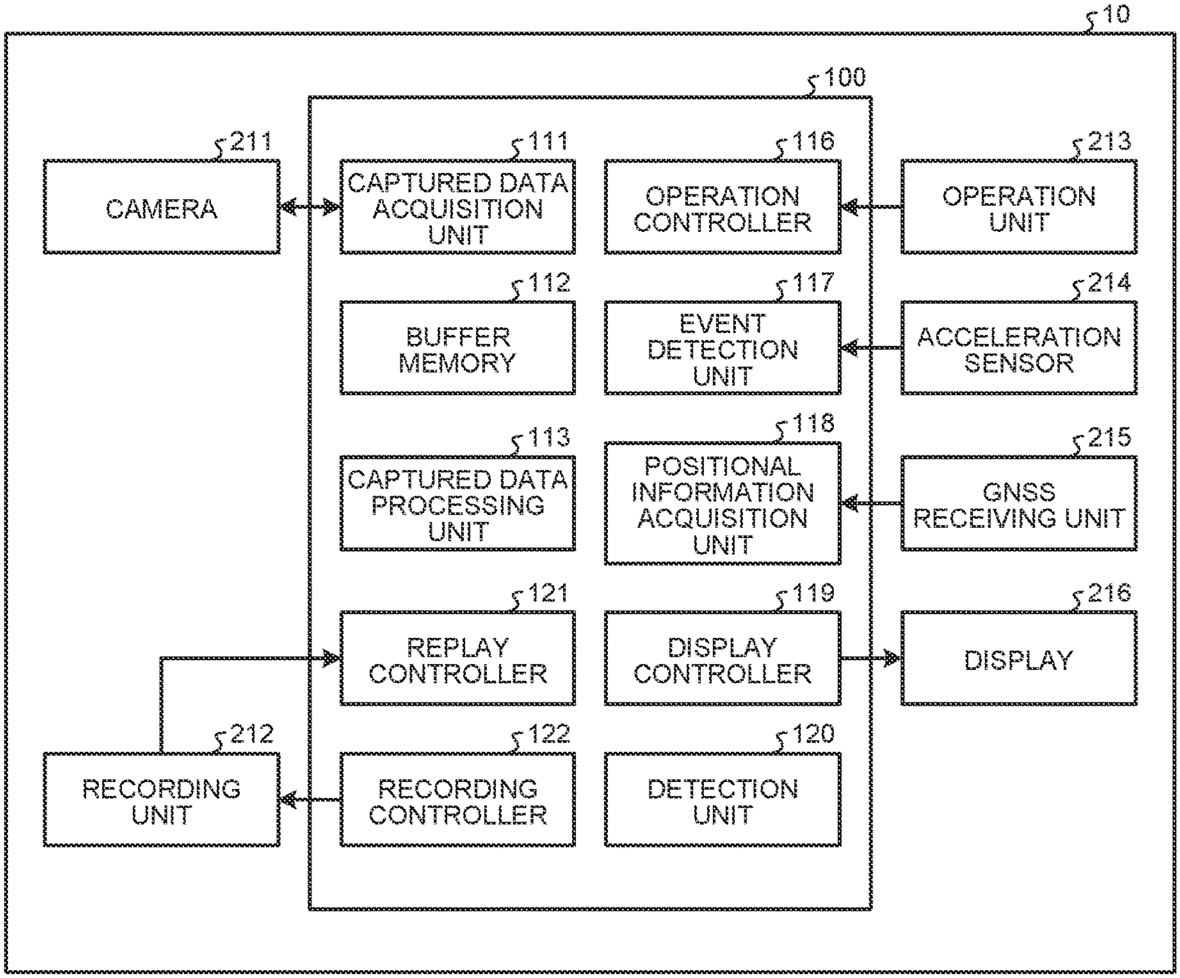
FIG. 1 is a block diagram illustrating a configuration example of an on-vehicle recording apparatus including a control apparatus according to a first embodiment.

FIG. 1 is a block diagram illustrating a configuration example of an on-vehicle recording apparatus 10 including an on-vehicle recording control apparatus (hereinafter, referred to as a "control apparatus") 100 according to a first embodiment. The on-vehicle recording apparatus 10 is what is called a drive recorder that records an event that has occurred with respect to a vehicle. The on-vehicle recording apparatus 10 changes a period in which video data is stored as event data based on a speech state of a voice command.

The on-vehicle recording apparatus 10 may be an apparatus that is installed in a vehicle or may be a portable apparatus that is available in the vehicle. Furthermore, the on-vehicle recording apparatus 10 may include a function or a configuration of a device that is installed in advance in the vehicle, a navigation device, or the like. The on-vehicle recording apparatus 10 includes a camera 211, a recording unit 212, an operation unit 213, an acceleration sensor 214, a Global Navigation Satellite System (GNSS) receiving unit 215, a display 216, and the control apparatus 100.

The camera 211 is a camera that captures an image of surroundings of the vehicle. The camera 211 may be a group of multiple cameras. The camera 211 is arranged at a position on a front side inside the vehicle at which an image in front of the vehicle can be captured, for example. In the present embodiment, the camera 211 continuously captures videos while an accessory power supply of the vehicle is ON. The camera 211 outputs captured video data to a captured data acquisition unit 111 of the control apparatus 100. The video data is a moving image formed of images at 27.5 frames per second, for example.

The recording unit 212 is used to temporarily store data for the on-vehicle recording apparatus 10. The recording unit 212 is, for example, a semiconductor memory device, such as a random access memory (RAM) or a flash memory, or a recording unit, such as a memory card. Alternatively, the recording unit 212 may be an external recording unit that is wirelessly connected via a communication apparatus (not illustrated). The recording unit 212 records loop recording video data or event data based on a control signal that is output from a recording controller 122 of the control apparatus 100.

The operation unit 213 is able to receive various kinds of operation for the on-vehicle recording apparatus 10. In the present embodiment, the operation unit 213 is, for example, a microphone that collects voice commands that instruct various kinds of operation. The microphone that serves as the operation unit may be shared as a microphone for inputting voice in addition to the video from the camera 211 to the captured data acquisition unit 111. The operation unit 213 may further include a touch panel that is arranged in an overlapping manner on a display screen of the display 216, for example. For example, the operation unit 213 is able to receive operation of manually storing the captured video data as event data in the recording unit 212. A voice command in this case may be, for example, "ro-ku-ga-ka-i-shi". For example, the operation unit 213 is able to receive operation of replaying the loop recording video data or the event data that is recorded in the recording unit 212. For example, the operation unit 213 is able to receive operation of deleting the event data that is recorded in the recording unit 212. For example, the operation unit 213 is able to receive operation of terminating loop recording. The operation unit 213 outputs operation information to an operation controller of the control apparatus 100.

The acceleration sensor 214 is a sensor that detects acceleration that occurs in the vehicle. The acceleration sensor 214 outputs a detection result to an event detection unit 117 of the control apparatus 100. The acceleration sensor 214 is, for example, a sensor for detecting acceleration in 3-axis directions. The 3-axis directions are a front-back direction, a left-right direction, and a vertical direction of the vehicle.

The GNSS receiving unit 215 includes a GNSS receiver for receiving a GNSS signal from a GNSS satellite, or the like. The GNSS receiving unit 215 outputs a received positional information signal to a positional information acquisition unit 118 of the control apparatus 100.

The display 216 is, as one example, a display device unique to the on-vehicle recording apparatus 10, a display device shared with a different system including a navigation system, or the like. The display 216 may be integrated with the camera 211. The display 216 is a display including, for example, a liquid crystal display (LCD), an organic electro-luminescence (EL) display, or the like. In the present embodiment, the display 216 is arranged on a dashboard, an instrument panel, a center console, or the like in front of a driver of the vehicle. The display 216 displays a video based on a video signal that is output from a display controller 119 of the control apparatus 100. The display 216 displays a video that is captured by the camera 211 or a video that is recorded in the recording unit 212.

On-Vehicle Recording Control Apparatus

The control apparatus 100 is, for example, an arithmetic processing device (control device) that is configured with a central processing unit (CPU) or the like. The control apparatus 100 loads a stored program onto a memory and executes a command included in the program. The control apparatus 100 includes an internal memory (not illustrated), and the internal memory is used to temporarily store data of the control apparatus 100. The control apparatus 100 includes the captured data acquisition unit 111, a buffer memory 112, a captured data processing unit 113, the operation controller 116, the event detection unit 117, the positional information acquisition unit 118, the display controller 119, a detection unit 120, a replay controller 121, and the recording controller 122.

The captured data acquisition unit 111 acquires video data of surroundings of the vehicle captured by the camera 211 that captures an image of the surrounding of the vehicle. The captured data acquisition unit 111 outputs the acquired video data to the buffer memory 112.

The buffer memory 112 is an internal memory included in the control apparatus 100, and is a memory for temporarily storing video data for a certain period of time that is acquired by the captured data acquisition unit 111, while updating the video data.

The captured data processing unit 113 converts the video data that is temporarily stored in the buffer memory 112 into an arbitrary file format, such as the MP4 format, which is encoded by an arbitrary method, such as H.264 or Moving Picture Experts Group (MPEG)-4, for example. The captured data processing unit 113 generates video data as a file for a certain period of time from the video data that are temporarily stored in the buffer memory 112. As a specific example, the captured data processing unit 113 generates, as a file, video data of 60 seconds in order of recording from among the video data that are temporarily stored in the buffer memory 112. The captured data processing unit 113 outputs the generated video data to the recording controller 122. Further, the captured data processing unit 113 decodes an image of the generated video data via the replay controller 121, and outputs the video data to the display controller 119. A duration of the video data that is generated as a file is assumed as 60 seconds as one example, but embodiments are not limited thereto. The video data described herein may be data including audio in addition to the images captured by the camera 211.

The operation controller 116 acquires operation information on operation that is received by the operation unit 213. More specifically, the operation controller 116 receives voice operation by a voice command that instructs event recording. The operation controller 116 receives operation on a physical interface such as a touch panel, analyzes the audio input from a microphone, and receives input of the voice command. Specifically, the operation controller 116 performs a voice recognition process for receiving a voice command. For example, the operation controller 116 acquires replay operation information instructing operation of replaying of deleting the video data or deletion operation information instructing operation of deleting the video data, and outputs a control signal. For example, the operation controller 116 acquires termination operation information instructing operation of terminating loop recording, and outputs a control signal. For example, the operation controller 116 receives a voice command of "ro-ku-ga-ka-i-shi" as operation information instructing operation for performing event recording, and outputs a control signal.

The event detection unit 117 detects an event based on acceleration that is added to the vehicle. More specifically, the event detection unit 117 detects an event based on a detection result of the acceleration sensor 214. The event detection unit 117 detects occurrence of an event when acceleration information acquired by the event detection unit 117 from the acceleration sensor 214 is equal to or smaller than a threshold.

The positional information acquisition unit 118 acquires positional information indicating a present location of the vehicle. The positional information acquisition unit 118 calculates the positional information on the present location of the vehicle by a well-known method based on the GNSS signal that is received by the GNSS receiving unit 215.

The display controller 119 controls display of the video data on the display 216. The display controller 119 outputs a video signal that causes the display 216 to output video data. More specifically, the display controller 119 outputs a video that is captured by the camera 211, loop recording video data that is recorded in the recording unit 212, or a video data to be displayed by replay of the event data.

The detection unit 120 detects a speech state of the voice command that is received by the operation controller 116. In the present embodiment, the detection unit 120 detects, as the speech state, a duration of the voice command. The detection unit 120 detects, as the speech state, that the duration of the voice command received by the operation controller 116 is shorter than a voice command standard duration that is set in advance. In the speech state in which the duration of the voice command is shorter than the voice command standard duration that is set in advance, it is estimated that a user is not able to speak a command in a calm state. A situation in which a user is not able to speak a command in a calm state is likely to be a situation in which an event to be recorded suddenly occurs or in which an event is not immediately recognized.

An example will be described by using a case in which a voice command for performing event recording is "ro-ku-ga-ka-i-shi". A standard duration for receiving the voice command of "ro-ku-ga-ka-i-shi" is set to, for example, 2.0 seconds to 4.0 seconds. The standard duration may be set in advance or may be determined by calculating an average value from a voice command input history of the user. As a voice recognition process, even if a voice of "ro-ku-ga-ka-i-shi" is input during a duration of, for example, 1.0 second to 5.0 seconds, which is shorter or longer than the standard duration, the voice is detectable as a command. The detection unit 120 detects whether the voice command of "ro-ku-ga-ka-i-shi" for instructing event recording, which is received by the operation controller 116, is shorter than 2.0 seconds.

The replay controller 121 controls replay of the loop recording video data or the event data recorded in the recording unit 212 based on a control signal for replay operation that is output from the operation controller 116. The replay controller 121 includes a decoder (not illustrated), decodes supplied compressed data, and replays various kinds of data.

The recording controller 122 records the video data that is acquired by the captured data acquisition unit 111. In one embodiment, the recording controller 122 performs control of recording, in the recording unit 212, video data that is generated as a file by the captured data processing unit 113. During a period in which a loop recording process is performed, such as when an accessory power supply of the vehicle is ON, the recording controller 122 records the video data that is generated as a file by the captured data processing unit 113 in the recording unit 212 as rewritable video data. More specifically, the recording controller 122 continuously records the video data generated by the captured data processing unit 113 in the recording unit 212 while the loop recording process is being performed, and when the capacity of the recording unit 212 becomes full, the recording controller 122 records new video data by overwriting the oldest video data.

When the event detection unit 117 detects an event, the recording controller 122 stores video data corresponding to the detection of the event. The video data corresponding to the detection of the event is video data of a predetermined period among the video data that are generated by the captured data processing unit 113. The recording controller 122 stores the video data corresponding to the detection of the event in the recording unit 212 as event data for which overwrite is prohibited. When the event detection unit 117 detects an event, for example, the recording controller 122 copies video data of a predetermined period, such as about 10 seconds before and after a time point at which the event is detected, from the buffer memory 112, and stores the copied video data as the event data.

The recording controller 122 generates event data while changing a period of event data extracted from the video data based on the speech state of the voice command that is detected by the detection unit 120 when the operation controller 116 receives voice operation on the event recording, and stores the event data. In the present embodiment, the recording controller 122 increases the period of event data extracted from the video data when it is detected that the speech state of the voice command is shorter than the standard duration. When it is detected that the speech state of the voice command is shorter than the standard duration, the recording controller 122 increases a retroactive period from a time point at which the voice command is received (hereinafter, referred to as an "event operation reception time point"), as the period of event data extracted from the video data. In the present embodiment, when it is detected that the speech state of the voice command is equal to or longer than the standard duration, the recording controller 122 adopts, as the period of the event data, a period from a time point retroactive by a first retroactive period P1 before the event operation reception time point to a time point elapsed by a first elapsed time P1' after the event operation reception time point. When it is detected that the speech state of the voice command is shorter than the standard duration, the recording controller 122 adopts, as the period of the event data, a period from a time point retroactive by a second retroactive period P2 (P1<P2) before the event operation reception time point to a time point elapsed by a second elapsed time P2' (P1'=P2') after the event operation reception time point.

Figure 2:
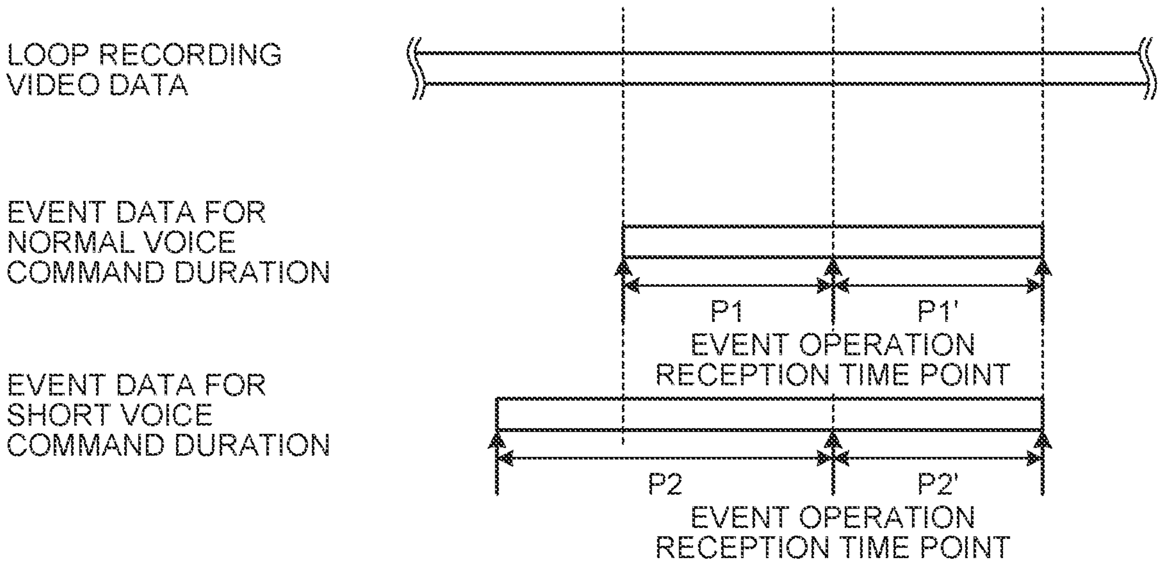
FIG. 2 is a diagram illustrating an example of an event data recording period.

FIG. 2 is a diagram illustrating an example of an event data recording period. As for loop recording video data, video data that is generated by the captured data processing unit 113 is continuously recorded while the loop recording process is being performed. The period of event data based on a normal voice command duration is a period from a time point retroactive by the first retroactive period P1 before the event operation reception time point to a time point elapsed by the first elapsed period P1' after the event operation reception time point. The period of event data based on a short voice command duration is a period from a time point retroactive by the second retroactive period P2 (P1<P2) before the event operation reception time point to a time point elapsed by the second elapsed period P2' (P1'=P2') after the event operation reception time point. For example, when the first retroactive period P1 is 10 seconds, the second retroactive period P2 is set to 15 seconds to 20 seconds or the like. Further, the first elapsed period P1' and the second elapsed period P2' are set to 10 seconds or the like.

Information Processing Performed by On-Vehicle Recording Control Apparatus

Figure 3:
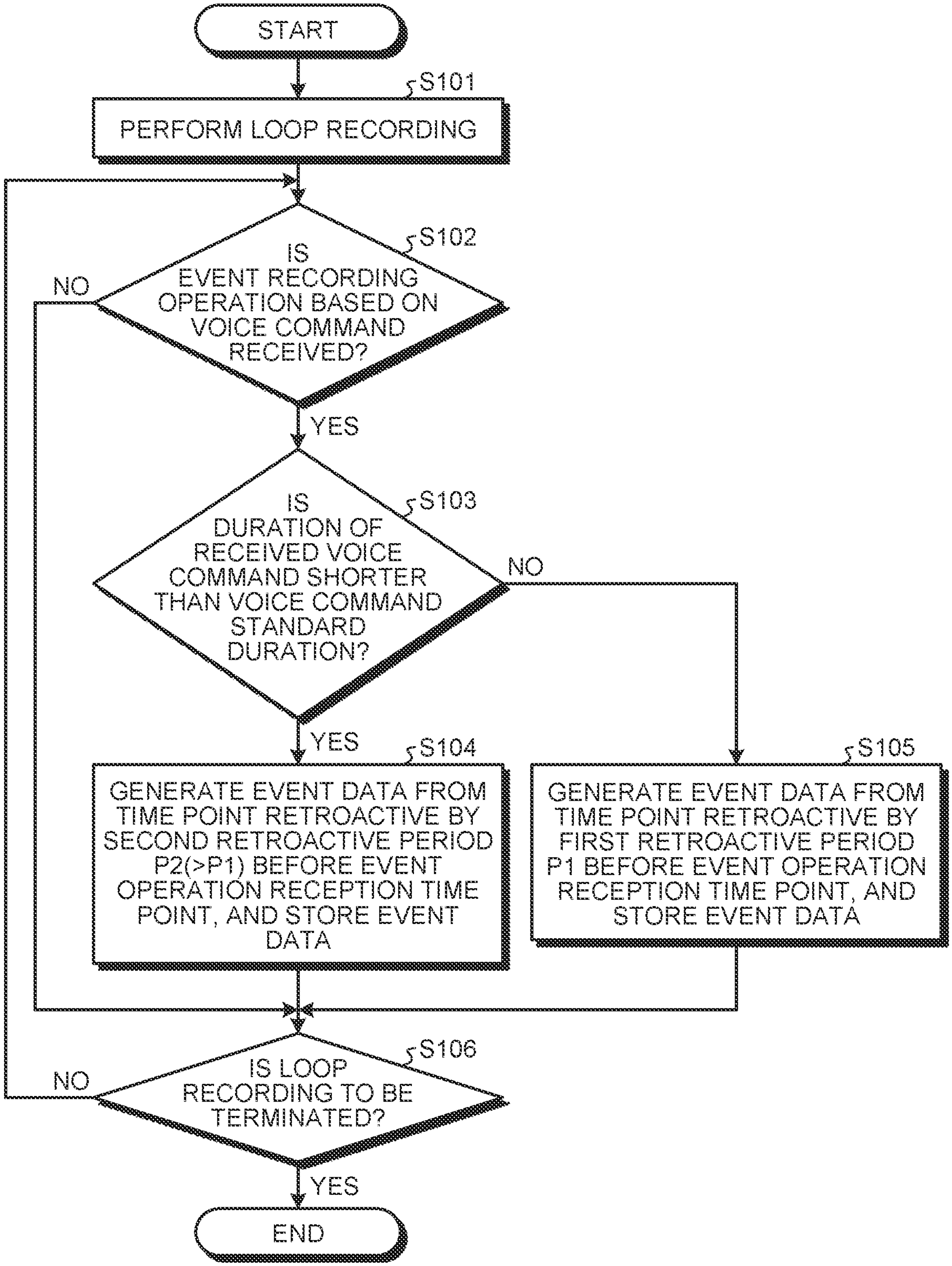
FIG. 3 is a flowchart illustrating an example of a flow of processes performed by the control apparatus according to the first embodiment.

A flow of processes performed by the control apparatus 100 will be described below with reference to FIG. 3. While the on-vehicle recording apparatus 10 is activated, the processes in the flowchart illustrated in FIG. 3 are performed. While the on-vehicle recording apparatus 10 is activated, the control apparatus 100 causes the acceleration sensor 214 to start to detect acceleration based on a set acceleration threshold. The control apparatus 100 causes the event detection unit 117 to start event detection based on the detected acceleration. Explanation of the event detection based on the detection of acceleration is not given here.

The control apparatus 100 starts to perform loop recording (Step S101). More specifically, the recording controller 122 starts to perform loop recording for recording a file generated by the captured data processing unit 113 in the recording unit 212 in an overwritable manner. The control apparatus 100 proceeds to Step S102.

The control apparatus 100 determines whether event recording operation based on a voice command is received (Step S102). If it is determined that the operation controller 116 has received the event recording operation based on the voice command (YES at Step S102), the process proceeds to Step S103. Alternatively, if it is not determined that the operation controller 116 has received the event recording operation based on the voice command (NO at Step S102), the process proceeds to Step S106.

If it is determined that the operation on event recording based on a voice command is received (YES at Step S102), the control apparatus 100 determines whether a duration of the received voice command is shorter than a voice command standard duration (Step S103). If the detection unit 120 detects that a duration of the voice command received by the operation controller 116 is shorter than the voice command standard duration that is set in advance (YES at Step S103), the process proceeds to Step S104. If the detection unit 120 does not detect that the duration of the voice command received by the operation controller 116 is shorter than the voice command standard duration that is set in advance (NO at Step S103), the process proceeds to Step S105.

If it is detected that the duration of the voice command is shorter than the voice command standard duration that is set in advance (YES at Step S103), the recording controller 122 generates event data from a time point retroactive by the second retroactive period P2 before the event operation reception time point, and stores the event data (Step S104). More specifically, the recording controller 122 records, in the recording unit 212, video data that is captured for a period from a time point retroactive by the second retroactive period P2 before the event operation reception time point to a time point elapsed by the second elapsed period P2' after the event operation reception time point, as event data for which overwrite is prohibited. The control apparatus 100 proceeds to Step S106.

If it is not detected that the duration of the voice command is shorter than the voice command standard duration that is set in advance (NO at Step S103), the recording controller 122 generates event data from a time point retroactive by the first retroactive period P1 before the event operation reception time point, and stores the event data (Step S105). More specifically, the recording controller 122 records, in the recording unit 212, video data that is captured for a period from a time point retroactive by the first retroactive period P1 before the event operation reception time point to a time point elapsed by the first elapsed period P1' after the event operation reception time point, as event data for which overwrite is prohibited. The control apparatus 100 proceeds to Step S106.

The control apparatus 100 determines whether to terminate the loop recording (Step S106). For example, it is determined that the loop recording is to be terminated when a power source or a driving source of the vehicle is turned off or when certain operation is performed on the operation unit 213. If it is determined that the loop recording is to be terminated (YES at Step S106), the control apparatus 100 terminates the processes. If it is not determined that the loop recording is to be terminated (NO at Step S106), the control apparatus 100 performs the process at Step S102 again.

As described above, in the present embodiment, when it is detected that the speech state of the voice command is shorter than the standard duration, event data is stored for a duration in which the second retroactive period P2 from the event operation reception time point is longer than the first retroactive period P1 from the event operation reception time point, where the first retroactive period P1 is adopted when it is detected that the speech state of the voice command is equal to or longer than the standard duration. In the present embodiment, when a voice command is not spoken in a calm state, it is possible to store event data retroactively to an earlier time point as compared to a case in which a voice command is spoken in a calm state. According to the present embodiment, when an event to be recorded suddenly occurs or when an event is not immediately recognized, it is possible to prevent a situation in which the event or the like is not appropriately recorded in recorded event data. In this manner, according to the present embodiment, it is possible to appropriately record an event.

Second Embodiment

Figure 4:
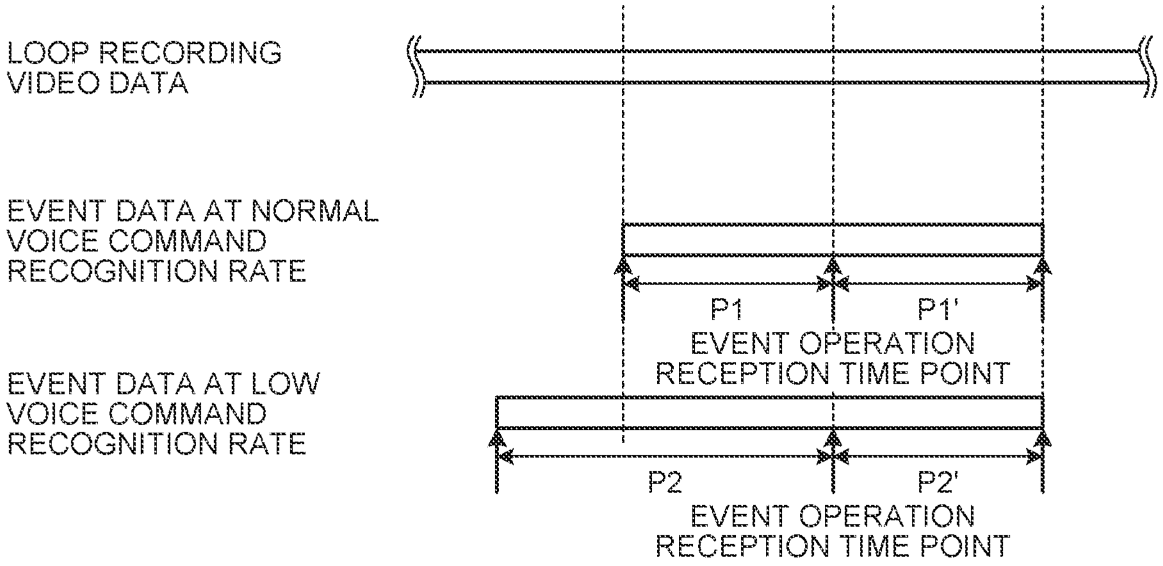
FIG. 4 is a diagram illustrating another example of the event data recording period.
Figure 5:
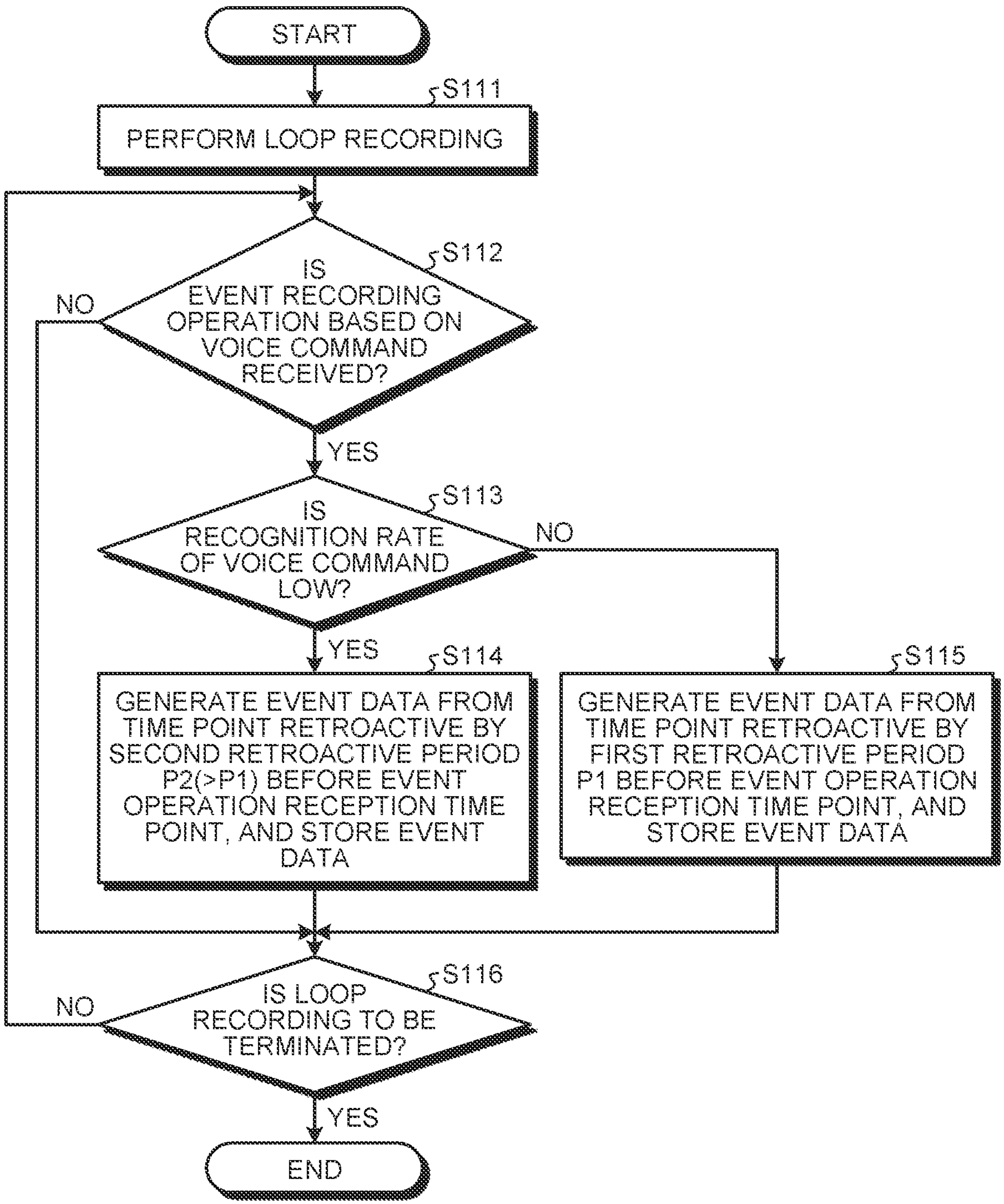
FIG. 5 is a flowchart illustrating an example of a flow of processes performed by a control apparatus according to a second embodiment.

An on-vehicle recording apparatus 10 according to a second embodiment will be described below with reference to FIG. 4 and FIG. 5. FIG. 4 is a diagram illustrating another example of the event data recording period. FIG. 5 is a flowchart illustrating an example of a flow of a processes performed by a control apparatus according to the second embodiment. A basic configuration of the on-vehicle recording apparatus 10 is the same as the on-vehicle recording apparatus 10 of the first embodiment. In the explanation below, the same components as those of the on-vehicle recording apparatus 10 are denoted by the same reference symbols or corresponding symbols, and detailed explanation thereof will be omitted. In the present embodiment, processes performed by the operation controller 116, the detection unit 120, and the recording controller 122 are different from those of the first embodiment.

A voice command includes, for example, four, five, or more syllables to prevent malfunction. For example, as for a voice command for performing event recording, "ro-ku-ga-ka-i-shi" formed of six syllables or the like is set. If a recognition rate of a voice command is equal to or larger than a predetermined threshold, the operation controller 116 allows reception of voice operation. If it is determined that the recognition rate of the voice command is low, the operation controller 116 does not allow reception of voice operation. For example, a threshold for determining that the recognition rate of the voice command is low is set to 60%. If the recognition rate of the voice command is, for example, equal to or larger than 60%, the operation controller 116 allows reception of voice operation. If the recognition rate of the voice command is, for example, smaller than 60%, the operation controller 116 does not allow reception of voice operation.

A case will be described in which a voice command for performing event recording is "ro-ku-ga-ka-i-shi". If a voice recognition rate of "ro-ku-ga-ka-i-shi" is, for example, equal to or larger than 60%, the operation controller 116 determines that a voice of "ro-ku-ga-ka-i-shi" is input and receives voice operation based on the voice command.

The detection unit 120 detects, as a speech state, that the recognition rate of the received voice command is low. More specifically, as for the recognition rate of the voice command, the detection unit 120 detects, as the speech state, that the recognition rate is low in a range in which voice operation is received. The recognition rate of the voice command is low when the voice command is not accurately spoken. This case is likely to be a case in which an event to be recorded suddenly occurs or an event to be recorded is not immediately recognized, so that the speech is quickly made.

For example, a case will be described in which the voice recognition rate is an average value of probabilities of phonemes for each of the phonemes. The operation controller 116 compares an input voice with an acoustic model of each phoneme, and if the probability that the phoneme is "ro" is, for example, equal to or 60%, it is determined that spoken phoneme is "ro". For example, with respect to a voice command of "ro-ku-ga-ka-i-shi" instructing event recording, if the probability that the first phoneme is "ro" is 70%, the probability that the second phoneme is "ku" is 95%, the probability that the third phoneme is "ga" is 80%, the probability that the fourth phoneme is "ka" is 90%, the probability that the fifth phoneme is "i" is 100%, and the probability that the sixth phoneme is "shi" is 90%, 87.5% that is an average value of the probabilities of the six phonemes is adopted as the voice recognition rate. In this case, the recognition rate of the voice command is equal to or larger than 75%, and therefore, is not determined as low.

Furthermore, if the probability that the first phoneme is "ro" is 60%, the probability that the second phoneme is "ku" is 90%, the probability that the third phoneme is "ga" is 70%, the probability that the fourth phoneme is "ka" is 70%, the probability that the fifth phoneme is "i" is 60%, and the probability that the sixth phoneme is "shi" is 60%, 68.3% that is an average value of the probabilities of the six phonemes is adopted as the voice recognition rate. In this case, the recognition rate of the voice command is equal to or smaller than 75%, and therefore, is determined as low.

In the case based on the recognition rate of each of the phonemes as described above, it is determined that the recognized phoneme is true if the voice recognition rate of each of the phonemes detected from spoken details is equal to or larger than 60%. Furthermore, the recognition rate is determined as low if the voice recognition rate of each of the detected phonemes is equal to or larger than 61% and smaller than 75%, and the recognition rate is not determined as low if the voice recognition rate is equal to or larger than 75%.

For example, a case will be described in which the voice recognition rate is a recognition rate as a word. If a voice recognition result is "ro-ku-na-ka-i-shi" or "ro-ku-o-ka-i-shi" (o indicates a phoneme that is not identified) and five phonemes among the six phonemes coincide with a voice command as a word, the recognition rate is 83%, therefore the recognition rate of the voice command is equal to or larger than 75%, and the recognition rate is not determined as low. If the voice recognition result is "o-ku-ga-a-i-shi" or "o-ku-ga-o-i-shi" and four phonemes among the six phonemes coincide with a voice command, the recognition rate is 66.6%, therfore the recognition rate of the voice command is smaller than 75%, and the recognition rate is determined as low.

In the case based on the recognition rate of each word as described above, it is determined that the recognized word is true if the voice recognition rate of each word including consecutive phonemes detected from spoken contents is equal to or larger than 60%. Furthermore, the recognition rate is determined as low if the voice recognition rate of the detected word is equal to or larger than 61% and smaller than 75%, and the recognition rate is not determined as low if the voice recognition rate is equal to or larger than 75%.

If it is detected that the recognition rate is low as the speech state of the voice command, the recording controller 122 increases a period of event data extracted from the video data. More specifically, in the present embodiment, if the recognition rate of the voice command is low, the recording controller 122 increases the period of event data extracted from the video data. If it is detected that the recognition rate of the voice command is low, the recording controller 122 increases a retroactive period from the event operation reception time point as the period of event data extracted from the video data. If it is detected that the recognition rate of the voice command is low, the recording controller 122 adopts, as the period of event data, a period from a time point retroactive by the second retroactive period P2 (P1<P2) before the event operation reception time point to a time point elapsed by the second elapsed time P2' (P1'=P2') after the event operation reception time point.

The event data recording period will be described below with reference to FIG. 4. The period of event data based on a normal voice command recognition rate is a predetermined period before or after a first start point, where the the event operation reception time point is adopted as the first start point. Specifically, the period of event data based on the normal voice command recognition rate is a period from a time point retroactive by the first retroactive period P1 before the event operation reception time point to a time point elapsed by the first elapsed period P1' after the event operation reception time point. The period of event data based on a low voice command recognition rate is a period from a time point retroactive by the second retroactive period P2 (P1<P2) before the event operation reception time point to a time point elapsed by the second elapsed period P2' (P1'=P2') after the event operation reception time point.

A flow of processes performed by the control apparatus 100 will be described below with reference to FIG. 5. Processes at Step S111, Step S112, and Step S114 to Step S116 illustrated in FIG. 5 are the same as the processes at Step S101, Step S102, and Step S104 to Step S106 in the flowchart illustrated in FIG. 3.

If it is determined that event recording operation based on a voice command is received (YES at Step S112), it is determined that the detection unit 120 has detected that the recognition rate of the voice command is low (Step S113). If it is determined that the detection unit 120 has detected that the recognition rate of the voice command is low (YES at Step S113), the control apparatus 100 proceeds to Step S114. If it is not determined that the detection unit 120 detected that the recognition rate of the voice command is low (NO at Step S113), the control apparatus 100 proceeds to Step S115.

As described above, in the present embodiment, when the recognition rate of the voice command is low, event data is stored for a duration in which the second retroactive period P2 from the event operation reception time point is longer than the first retroactive period P1 from the event operation reception time point, where the first retroactive period P1 is adopted when the recognition rate of the voice command is high. In the present embodiment, when a voice command is not accurately spoken, it is possible to store event data retroactively to an earlier time point as compared to a case in which a voice command is accurately spoken.

Third Embodiment

Figure 6:
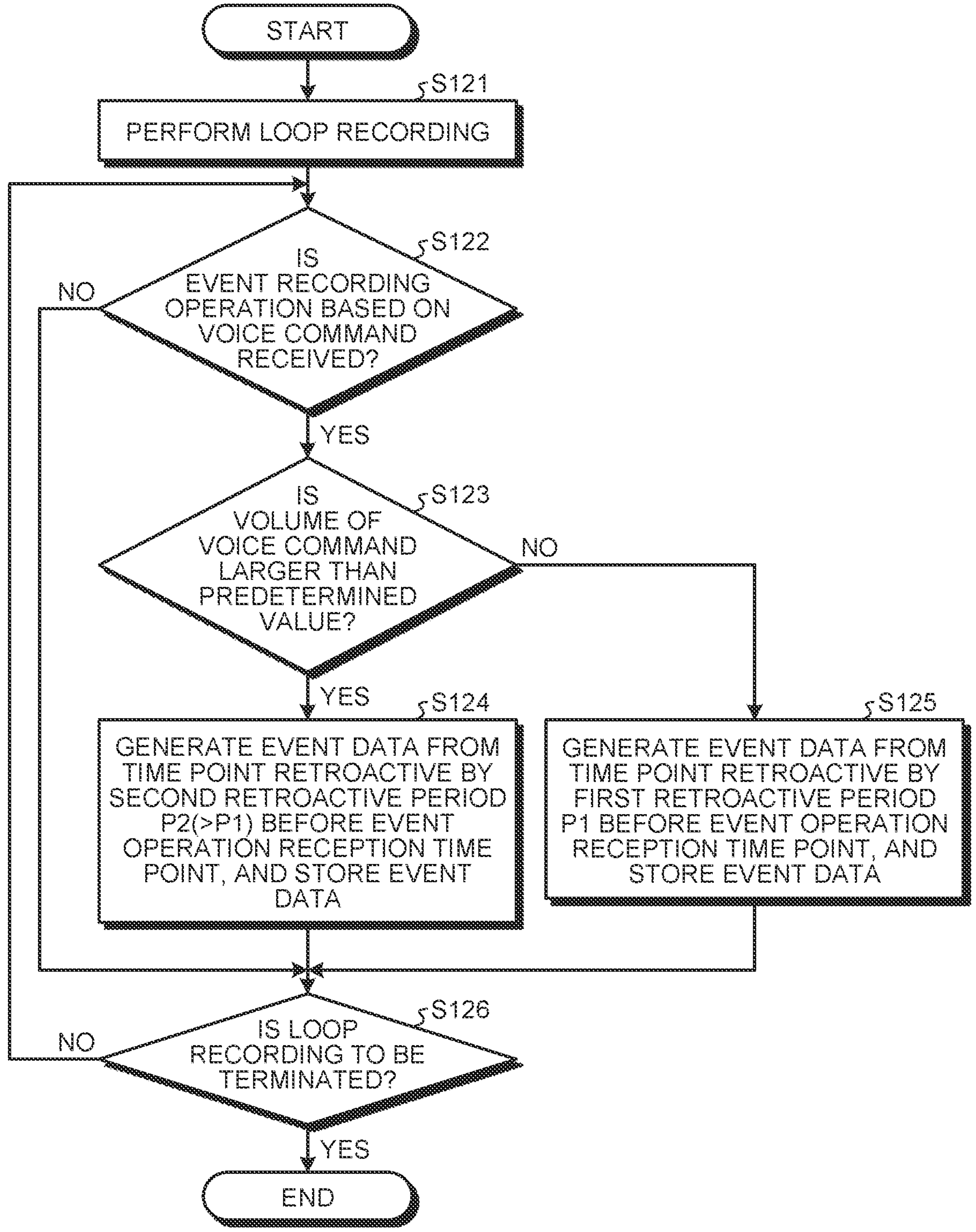
FIG. 6 is a flowchart illustrating an example of a flow of processes performed by a control apparatus according to a third embodiment.

An on-vehicle recording apparatus 10 according to a third embodiment will be described below with reference to FIG. 6. FIG. 6 is a flowchart illustrating an example of a flow of processes performed by a control apparatus according to the third embodiment. A basic configuration of the on-vehicle recording apparatus 10 is the same as the on-vehicle recording apparatus 10 of the first embodiment. In the present embodiment, processes performed by the detection unit 120 and the recording controller 122 are different from those of the first embodiment.

The detection unit 120 detects, as a speech state, a speech volume when a voice command is received by the voice command. More specifically, the detection unit 120 records speech volumes upon reception of various kinds of voice command including an event recording command, and records an average value of the speech volumes. When the operation controller 116 receives a voice command for recording an event, the detection unit 120 acquires a speech volume of the voice command and compares the speech volume with the average value.

When it is detected as the speech state of the voice command that the speech volume of the voice command is larger than a predetermined value, the recording controller 122 increases a period of event data extracted from the video data. For example, when it is detected that the speech volume of the voice command is is larger than a threshold volume or when it is detected that the speech volume of the voice command is larger than the average value, the recording controller 122 increases the period of event data extracted from the video data.

The period of event data in the present embodiment is the same as the period illustrated in FIG. 2 and FIG. 3. As one example, it is assumed that the average value of the speech volume is 50 dB, and a normal distribution where the speech volume is equal to or larger than 40 dB and equal to or smaller than 60 dB is in a range of $-3\sigma$ to $+3\sigma$. For example, when a voice command with the speech volume of 55 dB or more is detected, the speech volume is larger than the average value of the speech volume, and therefore, event data is generated from a time point retroactive by the second retroactive period P2. Meanwhile, the values described here are mere examples, and embodiments are not specifically limited thereto.

When the speech volume of the voice command instructing an event recording command is larger than a predetermined value, it is likely that a situation is urgent. Therefore, in this case, event data of a longer period is recorded.

If it is detected that the speech volume of the voice command is larger than a predetermined value, the recording controller 122 generates event data from a time point retroactive by the second retroactive period P2, and stores the event data. The period of the event data in the case where the speech volume of the voice command is larger than a predetermined value is a period from a time point retroactive bys the second retroactive period P2 (P1<P2) before the event operation reception time point to a time point elapsed by the second elapsed time P2' (P1'=P2') after the event operation reception time point.

A flow of processes performed by the control apparatus 100 will be described below with reference to FIG. 6. Processes at Step S121, Step S122, and Step S124 to Step S126 illustrated in FIG. 6 are the same as the processes at Step S101, Step S102, and Step S104 to Step S106 in the flow chart illustrated in FIG. 3.

If it is determined that event recording operation based on a voice command is received (YES at Step S122), the detection unit 120 determines whether the volume of the voice command is larger than a predetermined value (Step S123). If the detection unit 120 determines that the volume of the voice command is larger than a predetermined value (YES at Step S123), the control apparatus 100 proceeds to Step S124. If the detection unit 120 does not determine whether the volume of the voice command is larger than a predetermined value (NO at Step S123), the control apparatus 100 proceeds to Step S125.

As described above, in the present embodiment, when the speech volume of the voice command is larger than a predetermined value, event data is stored for a duration in which the second retroactive period P2 from the event operation reception time point is longer than the first retroactive period P1. In the present embodiment, in a highly urgent situation in which a voice command is spoken at a loud volume, it is possible to store event data of a past long period.

Fourth Embodiment

Figure 7:
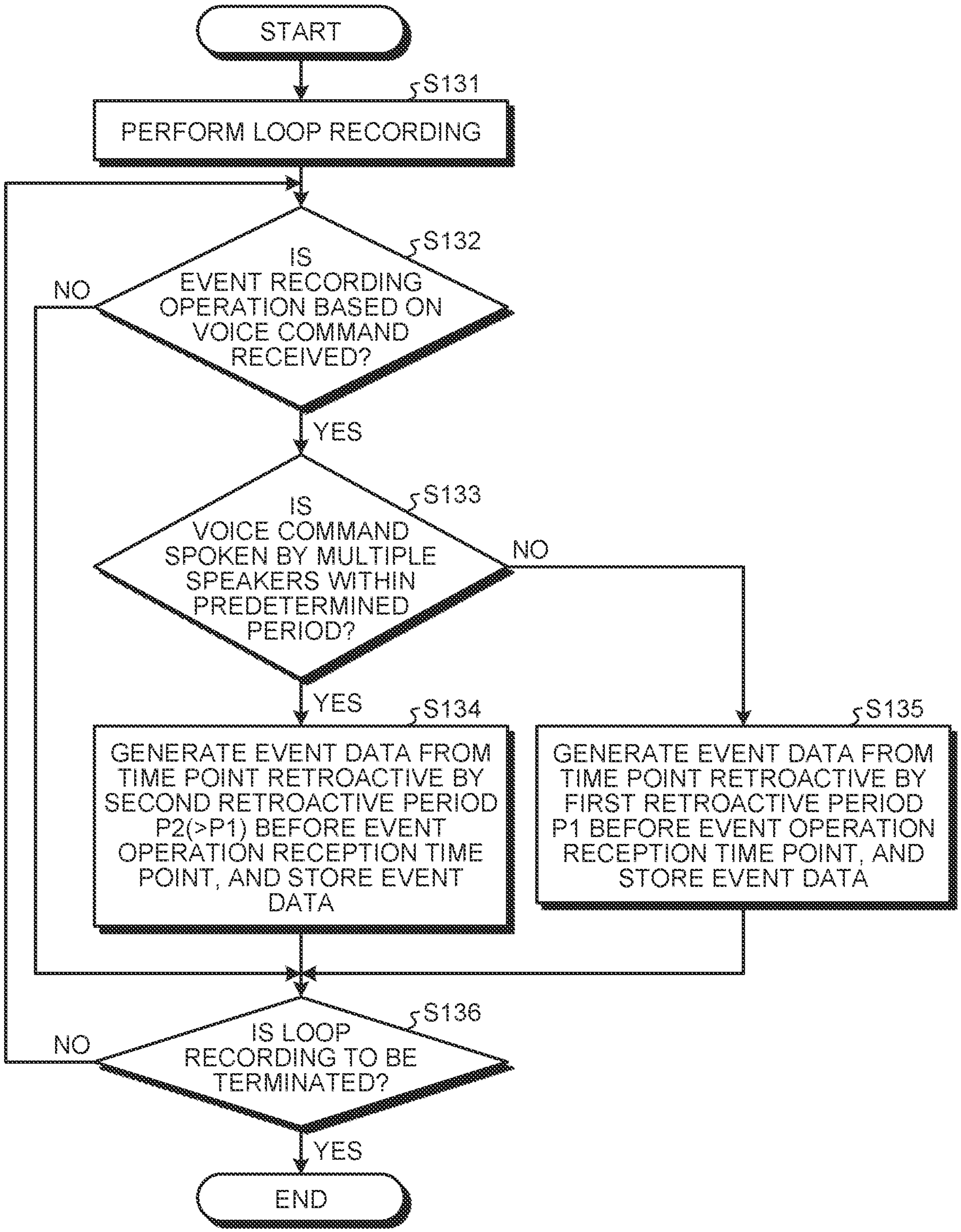
FIG. 7 is a flowchart illustrating an example of a flow of processes performed by a control apparatus according to a fourth embodiment.

An on-vehicle recording apparatus 10 according to a fourth embodiment will be described below with reference to FIG. 7. FIG. 7 is a flowchart illustrating an example of a flow of processes performed by a control apparatus according to the fourth embodiment. A basic configuration of the on-vehicle recording apparatus 10 is the same as the on-vehicle recording apparatus 10 of the first embodiment. In the present embodiment, processes performed by the operation controller 116, the detection unit 120, and the recording controller 122 are different from those of the first embodiment.

The operation controller 116 performs an audio source separation process for separating an audio source, in addition to a voice recognition process for receiving a voice command. The operation controller 116 separates voices of multiple speakers by an audio source separation process.

The detection unit 120 detects that, as a speech state, multiple speakers speak voice commands within a predetermined period, such as within about a few seconds, for example. More specifically, when the detection unit 120 detects that a different speaker speaks a voice command instructing event recording during a period in which a first-detected voice command instructing event recording is being spoken, or within one second after the first-detected voice command instructing event recording is spoken, for example, event data is generated from a time point retroactive by the second retroactive period P2 and the event data is stored.

When speeches of multiple voice commands temporally overlap with one another, the detection unit 120 determines that a speaker of a voice command that is initially detected and a speaker of a voice command that is subsequently detected are different, that is, multiple speakers of multiple voice commands are present. In other words, the detection unit 120 detects that multiple voice commands are spoken in a temporally overlapping manner, and determines that multiple speakers of the multiple voice commands are present.

For example, when speeches of multiple voice commands do not temporally overlap with one another, the detection unit 120 may determine that multiple speakers of multiple voice commands are present based on a difference in formant frequencies of spoken voices.

If it is detected, as the speech state of the voice command, that the voice command is spoken by multiple speakers in a predetermined period, the recording controller 122 increases the period of event data extracted from the video data.

When an event recording instruction using a voice command is given by multiple persons in parallel, it is more likely that a situation is urgent. Therefore, in this case, event data of a longer period is recorded. The period of event data in the present embodiment is the same as the period illustrated in FIG. 2 and FIG. 3.

If it is detected that the voice command is spoken by multiple speakers within the predetermined period, the recording controller 122 generates event data from a time point retroactive by the second retroactive period P2, and stores the event data. The period of event data in a case where the voice command is spoken by multiple speakers within the predetermined period is a period from a time point retroactive by the second retroactive period P2 (P1<P2) before the event operation reception time point to a time point elapsed by the second elapsed time P2' (P1'=P2') after the event operation reception time point.

A flow of processes performed by the control apparatus 100 will be described below with reference to FIG. 7. Processes at Step S131, Step S132, and Step S134 to Step S136 illustrated in FIG. 7 are the same as the processes at Step S101, Step S102, and Step S104 to Step S106 in the flow chart illustrated in FIG. 3.

If it is determined that event recording operation based on a voice command is received (YES at Step S132), the detection unit 120 determines whether a voice command is spoken by multiple speakers within a predetermined period (Step S133). If the detection unit 120 determines that the voice command is spoken by multiple speakers within a predetermined period (YES at Step S133), the control apparatus 100 proceeds to Step S134. If the detection unit 120 does not detect that the voice command is spoken by multiple speakers within a predetermined period (NO at Step S133), the control apparatus 100 proceeds to Step S135.

As described above, in the present embodiment, when an event recording instruction using a voice command is given by multiple persons in parallel, event data is stored for a duration in which the second retroactive period P2 from the event operation reception time point is longer than the first retroactive period P1. In the present embodiment, in a highly urgent situation in which a voice command is spoken by multiple persons, it is possible to store event data of a past long period as compared to other cases.

The on-vehicle recording apparatus 10 according to the present application may be embodied in various different modes other than the embodiments as described above.

The components of the on-vehicle recording apparatus 10 illustrated in the drawings are functionally conceptual and do not necessarily have to be physically configured in the manner illustrated in the drawings. In other words, specific forms of the apparatuses are not limited to those illustrated in the drawings, and all or part of the apparatuses may be functionally or physically distributed or integrated in arbitrary units according to processing loads or use conditions of the apparatuses.

The configuration of the on-vehicle recording apparatus 10 is realized as software by, for example, a program or the like loaded on a memory. In the embodiments described above, it is explained that the functional blocks are implemented by cooperation with hardware or software. In other words, the functional blocks are realized in various forms using only hardware, using only software, or using a combination of hardware and software.

The components described above include one that can easily be thought of by a person skilled in the art and one that is practically identical. Further, the configurations described above may be combined appropriately. Furthermore, within the scope not departing from the gist of the present application, various omission, replacement, and modifications of the components may be made.

The on-vehicle recording control apparatus and the recording control method according to the present application may be applied to, for example, a drive recorder.

According to the present application, it is possible to appropriately record an event.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An on-vehicle recording control apparatus comprising:

a camera configured to capture an image of surroundings of a vehicle;

a microphone configured to receive a voice command;

a memory that is configured to store computer executable instructions; and a processor that is configured to execute the computer executable instructions to perform operations, comprising:

acquiring video data captured by the camera;

receiving voice operation based on the voice command received by the microphone and instructing event recording;

detecting a speech state of the voice command of the voice operation received by the receiving;

recording the video data acquired by the acquiring;

generating event data while changing, based on the speech state of the voice command detected by the detecting when the receiving receives the voice operation for event recording, a period of the event data that is extracted from the video data; and storing the generated event data, wherein the detecting further comprises detecting that, as the speech state, a duration of the voice command of the voice operation received by the receiving is shorter than a voice command standard duration that is set in advance, and the recording further comprises increasing, when it is detected that the speech state of the voice command is shorter than the voice command standard duration, the period of the event data extracted from the video data.

2. An on-vehicle recording control apparatus, comprising:

a camera configured to capture an image of surroundings of a vehicle;

a microphone configured to receive a voice command;

a memory that is configured to store computer executable instructions; and a processor that is configured to execute the computer executable instructions to perform operations, comprising:

acquiring video data captured by the camera;

receiving voice operation based on the voice command received by the microphone and instructing event recording;

detecting a speech state of the voice command of the voice operation received by the receiving;

recording the video data acquired by the acquiring;

generating event data while changing, based on the speech state of the voice command detected by the detecting when the receiving receives the voice operation for event recording, a period of the event data that is extracted from the video data; and storing the generated event data, wherein the receiving further comprises receiving the voice operation when a recognition rate of the voice command is equal to or larger than a predetermined threshold, the detecting further comprises detecting, as the speech state, that the recognition rate of the voice command is low in a range of the recognition rate in which the voice operation is received, and the recording further comprises increasing, when it is detected that the recognition rate is low as the speech state of the voice command, the period of the event data extracted from the video data.

3. An on-vehicle recording control apparatus, comprising:

a camera configured to capture an image of surroundings of a vehicle;

a microphone configured to receive a voice command;

a memory that is configured to store computer executable instructions; and a processor that is configured to execute the computer executable instructions to perform operations, comprising:

acquiring video data captured by the camera;

receiving voice operation based on the voice command received by the microphone and instructing event recording;

detecting a speech state of the voice command of the voice operation received by the receiving;

recording the video data acquired by the acquiring;

generating event data while changing, based on the speech state of the voice command detected by the detecting when the receiving receives the voice operation for event recording, a period of the event data that is extracted from the video data; and storing the generated event data, wherein the detecting further comprises detecting, as the speech state, a speech volume of the voice command when the voice operation is received, and the recording further comprises increasing, when it is detected, as the speech state of the voice command, that the speech volume of the voice command is larger than a predetermined value, the period of event data extracted from the video data.

4. The on-vehicle recording control apparatus according to claim 1, wherein the recording further comprises increasing, as the period of the event data extracted from the video data, a retroactive period from a time point at which the voice operation is received.

* * * * *